US012380219B2

United States Patent
Liu et al.

(10) Patent No.: US 12,380,219 B2
(45) Date of Patent: Aug. 5, 2025

(54) ASSET RISK ASSESSMENT METHOD, APPARATUS, COMPUTER DEVICE, AND STORAGE MEDIUM

(71) Applicant: DBAPPSECURITY CO., LTD, Hangzhou (CN)

(72) Inventors: Shuhang Liu, Hangzhou (CN); Yuan Fan, Hangzhou (CN); Lang Lang, Hangzhou (CN); Bo Liu, Hangzhou (CN)

(73) Assignee: DBAPPSECURITY CO., LTD, Hangzhou (CN)

( * ) Notice: Subject to any disclaimer, the term of this patent is extended or adjusted under 35 U.S.C. 154(b) by 268 days.

(21) Appl. No.: 18/027,372

(22) PCT Filed: May 7, 2021

(86) PCT No.: PCT/CN2021/092222
§ 371 (c)(1),
(2) Date: Mar. 21, 2023

(87) PCT Pub. No.: WO2022/062416
PCT Pub. Date: Mar. 31, 2022

(65) Prior Publication Data
US 2023/0376606 A1    Nov. 23, 2023

(30) Foreign Application Priority Data
Sep. 22, 2020   (CN) .......................... 202011001681.5

(51) Int. Cl.
  *G06F 21/57*   (2013.01)
(52) U.S. Cl.
  CPC ................................ *G06F 21/577* (2013.01)

(58) Field of Classification Search
  CPC .................................................... G06F 21/577
  See application file for complete search history.

(56) References Cited

U.S. PATENT DOCUMENTS 11,757,916 B1 * 9/2023 Woolgar-O'Neil .......................... G06Q 10/0635
11,831,670 B1 * 11/2023 Molls ................... H04L 63/1441
(Continued)

FOREIGN PATENT DOCUMENTS

| CN | 110598404 A | 12/2019 |
|----|-------------|---------|
| CN | 110851839 A | 2/2020  |

(Continued)

OTHER PUBLICATIONS

International Search Report of PCT/CN2021/092222.
China Office Action of 202011001681.5.

*Primary Examiner* — Stephen T Gundry

(57) ABSTRACT

An asset risk assessment method, an apparatus, a computer device, and a storage medium are provided. The asset risk assessment method includes: receiving an alert message of an asset to be assessed; obtaining an attack depth of the alert message based on the alert message, and the attack depth being a degree to which the asset to be assessed is subjected to attack; obtaining a security feature value of the asset to be assessed; obtaining a feature weight of the security feature value based on the attack depth; and performing a risk assessment of the asset to be assessed based on the security feature value and the feature weight thereof, to obtain a risk assessment result.

16 Claims, 7 Drawing Sheets

(56) References Cited

U.S. PATENT DOCUMENTS

| | | | | |
|---|---|---|---|---|
| 11,863,578 | B1* | 1/2024 | Speck | G06N 5/022 |
| 2006/0235649 | A1 | 10/2006 | Lancaster et al. | |
| 2015/0237062 | A1* | 8/2015 | Roytman | H04L 63/1433 |
| | | | | 726/25 |
| 2020/0177618 | A1* | 6/2020 | Hassanzadeh | G06F 21/552 |
| 2021/0021636 | A1* | 1/2021 | Sbandi | H04L 63/1466 |
| 2021/0367961 | A1* | 11/2021 | Kuppa | G06F 40/205 |
| 2023/0017839 | A1* | 1/2023 | Mizushima | G06F 21/552 |
| 2023/0275967 | A1* | 8/2023 | Grindstaff, II | G06F 18/2415 |
| | | | | 726/25 |
| 2023/0315863 | A1* | 10/2023 | Wang | G06F 21/577 |
| | | | | 726/25 |
| 2023/0336581 | A1* | 10/2023 | Dunn | G06F 21/577 |
| 2023/0351456 | A1* | 11/2023 | Hogg | H04L 63/1433 |
| 2023/0362200 | A1* | 11/2023 | Crabtree | G06N 5/022 |
| 2023/0379352 | A1* | 11/2023 | Kuppa | G06F 40/205 |
| 2024/0171603 | A1* | 5/2024 | Roytman | H04L 63/1466 |
| 2024/0193280 | A1* | 6/2024 | Reguly | G06F 17/11 |
| 2024/0232767 | A1* | 7/2024 | White | H04L 63/1433 |
| 2024/0348640 | A1* | 10/2024 | King-Wilson | H04L 63/1433 |

FOREIGN PATENT DOCUMENTS

| | | |
|---|---|---|
| CN | 111565184 A | 8/2020 |
| CN | 112163753 A | 1/2021 |

\* cited by examiner

| Attack chains/ Direction | Initiator | Victim |
|---|---|---|
| Reconnaissance | 10 | 1 |
| Delivery | 10 | 2 |
| Exploitation | 10 | 3 |
| Command control | 9 | 4 |
| Internal reconnaissance | 7 | 5 |
| Lateral infiltration | 8 | 6 |
| Profit | 10 | 10 |

FIG. 3

| Risk level | Result |
|---|---|
| Loss | Result≥0.95 |
| High risk | 0.7≤result<0.95 |
| Medium risk | 0.3≤result<0.7 |
| Low risk | 0.1≤result<0.3 |
| Health | Result<0.1 |

FIG. 4

ASSET RISK ASSESSMENT METHOD, APPARATUS, COMPUTER DEVICE, AND STORAGE MEDIUM

CROSS-REFERENCE TO RELATED APPLICATIONS

This application is a U.S. national phase application under 35 U.S.C. § 371 base upon international patent application No. PCT/CN2021/092222, filed on May 7, 2021, titled "ASSET RISK ASSESSMENT METHOD, APPARATUS, COMPUTER DEVICE, AND STORAGE MEDIUM", which itself claims all benefits accruing from China Patent Application No. 202011001681.5, filed on Sep. 22, 2020, titled "ASSET RISK ASSESSMENT METHOD, APPARATUS, COMPUTER DEVICE, AND STORAGE MEDIUM" in the China National Intellectual Property Administration, both of which are hereby incorporated by reference.

TECHNICAL FIELD

The present disclosure relates to the field of information security technology, and in particular, to an asset risk assessment method, an apparatus, a computer device, and a storage medium.

BACKGROUND

According to security requirements for network assets put forward by countries and units, security personnel should ensure confidentiality, integrity, and availability of information systems and information transmission and storage thereof. In a case of excessive assets, excessive security devices, and excessive number of alarms generated by the security devices, it is difficult to obtain and deal with a security situation of assets in time, and a security inspection process lacks focus and is slow.

In a conventional method for asset risk assessment, judgment for each feature weight of feature values of the assets relies on knowledge of an expert, and assessment results can be directly affected by magnitude of the feature weights of the feature values, thus leading to low efficiency and low accuracy.

SUMMARY

The present disclosure provides an asset risk assessment method, an apparatus, a computer device, and a storage medium, which can solve a problem that judgment for each feature weight of feature value of assets relies on knowledge of an expert, and assessment results can be directly affected by magnitude of the feature weights of the feature values, thus leading to low efficiency and low accuracy.

In a first aspect, the present disclosure provides an asset risk assessment method, including:
  receiving an alert message of an asset to be assessed;
  obtaining an attack depth of the alert message based on the alert message, the attack depth being
  a degree to which the asset to be assessed is subjected to attack;
  obtaining a security feature value of the asset to be assessed;
  obtaining a feature weight of the security feature value based on the attack depth; and
  performing a risk assessment of the asset to be assessed based on the security feature value and the feature weight thereof, to obtain a risk assessment result.

In some embodiments, the obtaining the attack depth of the alert message based on the alert message further includes:
  dividing the alert information into attack chains based on a content of the alert information and an attack method; and
  obtaining the attack depth of the alert message based on the attack chains.

In some embodiments, the obtaining the security feature value of the asset to be assessed further includes:
  obtaining an attack chain coverage, the number of attacks, an attack breadth, an asset vulnerability profile, an asset protection level, and an asset failure profile of the asset to be assessed which is subjected to attack; and
  obtaining the security feature value based on the attack chain coverage, the number of attacks, the attack breadth, the asset vulnerability profile, the asset protection level, and the asset failure profile.

In some embodiments, the obtaining the feature weight of the security feature value based on the attack depth further includes:
  the deeper the attack depth is, the greater the feature weights of the feature values of the attack chain coverage and the asset failure profile are, and the less the feature weights of the feature values of the number of attacks, the attack breadth, the asset vulnerability profile, and the asset protection level are.

In some embodiments, the performing the risk assessment of the asset to be assessed based on the security feature value and the feature weight thereof, to obtain the risk assessment result further includes:
  multiplying the security feature value with the feature weight in matrix to obtain a risk assessment coefficient; and
  obtaining the risk assessment result based on the risk assessment coefficient.

In some embodiments, the risk assessment result includes five levels of failure, high risk, medium risk, low risk, and healthy.

In some embodiments, after performing the risk assessment of the asset to be assessed based on the security feature value and the feature weight thereof, to obtain the risk assessment result, the method further includes:
  obtaining a value parameter of the asset to be assessed based on a category of the asset to be assessed; and
  obtaining a comprehensive asset assessment result based on the value parameter of the asset to be assessed and the risk assessment result.

In a second aspect, the present disclosure further provides an asset risk assessment apparatus, including a receiving module, an attack depth obtaining module, a feature value obtaining module, a feature weight obtaining module, and an assessment module.

The receiving module is configured for receiving an alert message of an asset to be assessed;
  the attack depth obtaining module is configured for obtaining an attack depth of the alert message based on the alert message, and the attack depth is a degree to which the asset to be assessed is subjected to attack;
  the feature value obtaining module is configured for obtaining a security feature value of the asset to be assessed;
  the feature weight obtaining module is configured for obtaining a feature weight of the security feature value based on the attack depth; and the assessment module is configured for performing a risk assessment of the asset to be assessed based on the security feature value and the feature weight thereof, to obtain a risk assessment result.

In a third aspect, the present disclosure further provides a computer device, including a processor and a memory that stores a computer program running on the processor. The computer program is executed by the processor to implement the steps of the asset risk assessment method in the first aspect.

In a fourth aspect, the present disclosure further provides a storage medium having stored a computer program. The computer program is executed by a processor to implement the steps of the asset risk assessment method in the first aspect.

In contrast to the related art, the present disclosure provides an asset risk assessment method, an apparatus, a computer device, and a storage medium. The method includes receiving an alert message of an asset to be assessed, obtaining an attack depth of the alert message based on the alert message, the attack depth being a degree to which the asset to be assessed is subjected to attack, obtaining a security feature value of the asset to be assessed, obtaining a feature weight of the security feature value based on the attack depth, and performing a risk assessment of the asset to be assessed based on the security feature value and the feature weight thereof, to obtain a risk assessment result. With the steps described above, the attack depth of the alert message can be taken as a standard to determine each feature weight of the security feature values of the asset and automatically assess the asset risk, without relying on manual experience, improving efficiency and accuracy of the assessment.

The details of one or more embodiments of the present disclosure are set forth in the accompanying drawings and the description below. Other features, objects and advantages of the present disclosure will become apparent from the description and drawings.

BRIEF DESCRIPTION OF THE DRAWINGS

The drawings illustrated herein are used to provide a further understanding of the present disclosure, constituting part of the present disclosure. Illustrative embodiments of the present disclosure and its description used for explain the present disclosure, are not construed as an undue qualification of the present disclosure. In the drawings:

FIG. 3 is a schematic diagram of assigning an attack depth in an asset risk assessment method in an embodiment of the present disclosure.

FIG. 4 is a corresponding relationship diagram of a risk assessment coefficient and a risk assessment result in an asset risk assessment method in an embodiment of the present disclosure.

DETAILED DESCRIPTION

Figure 1:
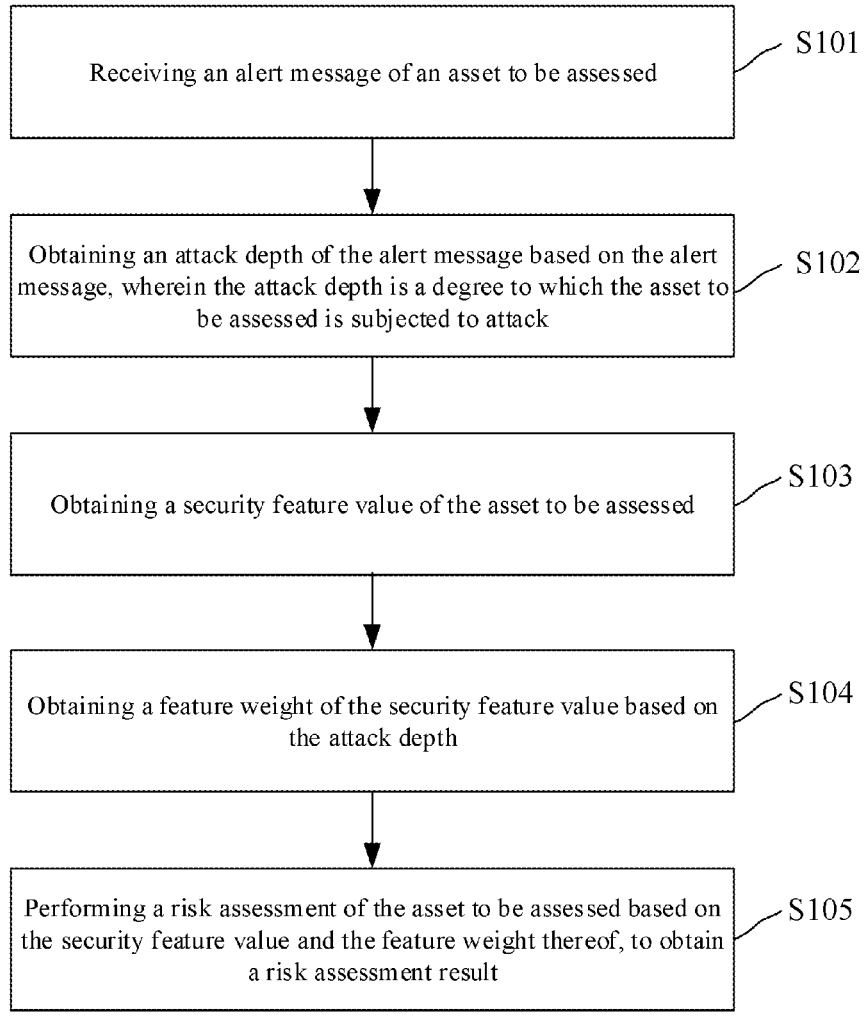
FIG. 1 is a flowchart of an asset risk assessment method in an embodiment of the present disclosure.

In order to make objects, technical solutions and advantages of the present disclosure more clearly understood, the present disclosure is described and illustrated in the following with reference to the accompanying drawings and embodiments. It should be understood that specific embodiments described herein are only used to explain the present disclosure and not intended to limit the present disclosure. All other embodiments obtained by those skilled in the art based on the embodiments of the present disclosure without making creative labor are within the scope of the present disclosure.

The drawings described below are merely some examples or embodiments of the present disclosure, for those of ordinary skill in the art, without making creative labor, the present disclosure may be applied to other similar situations according to these drawings. It is also understood that although the efforts made in such development process may be complex and lengthy, some changes in design, manufacture or production based on the technical content disclosed in the present disclosure are only conventional technical means to those skilled in the art related to the content disclosed in the present disclosure and should not be construed as inadequate for the content disclosed in the present disclosure.

The reference to "embodiment" in the present disclosure means that with reference to the particular features, structures or characteristics described in the embodiments may be included in at least one embodiment of the present disclosure. The phrase "embodiment" appears in various positions in the description does not necessarily refer to the same embodiment, nor is it a separate or embodiment that is mutually exclusive with other embodiments. It can be expressly and implicitly understood by those skilled in the art that the embodiments described in the present disclosure may be combined with other embodiments in the absence of conflict.

Unless otherwise defined, all technical and scientific terms used herein have the same meaning as a skilled person in the art would understand. The term "one", "a", "an", "the" and other similar words as used in the present disclosure do not indicate quantitative limitations, and they can be singular or plural. The terms "include", "comprise", "have", and any variation thereof, as used in the present disclosure, are intended to cover a non-exclusive inclusion. For example, processes, methods, systems, products, or devices including a series of steps or modules (units) are not limited to listed steps or units, but may include steps or units not listed, or may include other steps or units inherent in those processes, methods, products, or devices.

The terms "connection", "connected", "coupling", and other similar words as used in the present disclosure are not limited to physical or mechanical connections, but may include electrical connections, which can be direct connections or indirect connections. The term "plurality" in the present disclosure refers to two or more. "And/or" describes an association relationship between associated objects, indicating that there can be three kinds of relationships. For example, "A and/or B" can mean that A exists alone, A and B exist at the same time, and B exists alone. The character "/" indicates that the objects associated with each other are in an "or" relationship. The terms "first", "second", "third", etc. involved in the present disclosure are only configured for distinguishing similar objects, and do not represent a specific order of the objects.

FIG. 1 is a flowchart of an asset risk assessment method in an embodiment of the present disclosure.

In the present embodiment, the asset risk assessment method includes step 101 to step 105.

Step 101 includes receiving an alert message of an asset to be assessed.

It can be understood that each alert message may be hidden danger data obtained after detection of the corresponding asset.

Step 102 includes obtaining an attack depth of the alert message based on the alert message, and the attack depth is a degree to which the asset to be assessed is subjected to attack.

In some embodiments, the attack depth can be obtained by dividing the alert information into attack chains, determining the degree to which the asset to be assessed is subjected to attack based on the attack chains of the alert information, and assigning the degree to which the asset to be assessed is subjected to attack. It can be understood that, the greater the degree to which the asset to be assessed is subjected to attack, the deeper the attack depth is. Specifically, the attack depth can be assigned according to an attack chains division condition and an actual situation of the alert message.

Step 103 includes obtaining a security feature value of the asset to be assessed.

In the present embodiment, the security feature of the asset can be assigned, so that a safety situation of the asset can be quantified for a subsequent risk assessment.

Step 104 includes obtaining a feature weight of the security feature value based on the attack depth.

It is understood that different security risks of the assets to be assessed may be corresponding to the alert messages with different attack depths, and attentions thereof are different, so that the feature weight of the security feature during the risk assessment should also change accordingly.

Step 105 includes performing a risk assessment of the asset to be assessed based on the security feature value and the feature weight thereof, to obtain a risk assessment result.

In some embodiments, a value representing risk situations of the asset to be assessed, i.e., the risk assessment result, can be calculated based on the security feature value and the feature weight thereof.

The asset risk assessment method mentioned above includes receiving an alert message of an asset to be assessed, obtaining an attack depth of the alert message based on the alert message, the attack depth being a degree to which the asset to be assessed is subjected to attack, obtaining a security feature value of the asset to be assessed, obtaining a feature weight of the security feature value based on the attack depth, and performing a risk assessment of the asset to be assessed based on the security feature value and the feature weight thereof, to obtain a risk assessment result. With the steps described above, the attack depth of the alert message can be taken as a standard to determine each feature weight of the security feature values of the asset and automatically assess the asset risk, without relying on manual experience, improving efficiency and accuracy of the assessment.

Figure 2:
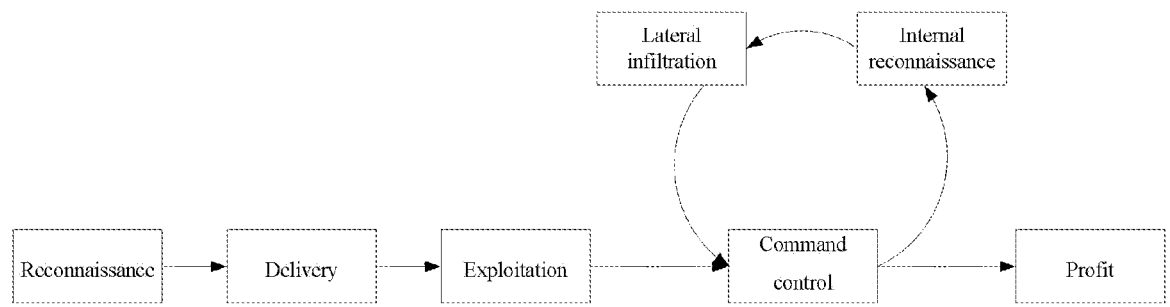
FIG. 2 is a schematic diagram of dividing alert information into attack chains in an asset risk assessment method in an embodiment of the present disclosure.

In some embodiments, the obtaining the attack depth of the alert message based on the alert message can further include: dividing the alert information into attack chains based on a content of the alert information and an attack method, and obtaining the attack depth of the alert message based on the attack chains. It can be understood that the alert messages can be divided into attack chains including seven nodes: reconnaissance, delivery, exploitation, command control, internal reconnaissance, lateral infiltration, and profit. FIG. 2 is a schematic diagram of dividing the alert information into attack chains in an asset risk assessment method in an embodiment of the present disclosure. In other embodiments, other types of methods for dividing the attack chain may be applied according to an actual situation.

FIG. 3 is a schematic diagram of assigning the attack depth in an asset risk assessment method in an embodiment of the present disclosure. It can be understood that, when an asset to be assessed belongs to an initiator of an attack, in most cases it may indicate that a problem exists in the asset, such as being controlled or infected with a trojan horse, so the attack depth is deeper. In some embodiments, when a location of the attack chains in an attack initiated by the asset is the node of reconnaissance, the attack depth may be 10. When an asset to be assessed belongs to a victim of an attack, the attack depth may be deepened as the location of the attack chains in the attack is deepened. In some embodiments, when the location of the attack chains in the attack on the asset is the node of reconnaissance, the attack depth may be 1. When the location of the attack chains in the attack on the asset is the node of delivery, the attack depth may be 2. In other embodiments, the specific assignment of the attack depth can be determined according to the actual situation. Specifically, the attack depth can be assigned according to the location of the attack chains in the attack, and the deeper the attack depth is, the greater the assigned value is, so as to obtain an attack depth rating denoted as $KL\{Depth_1, Depth_2, Depth_3, \ldots, Depth_n\}$, and $Depth_2, Depth_1, Depth_3, \ldots,$ and $Depth_n$ satisfy the following formula: $Depth_1 < Depth_2 < Depth_3 < \ldots < Depth_n$.

In other embodiments, the alert message involved in the asset to be assessed can be grouped and counted according to the attack depth. The alert message can be regarded as being covered when the attack depth thereof is not 0, and a set of attack behaviors can be obtained.

Moreover, the set of attack behaviors can be sorted according to the attack depth, so as to get a set denoted as $D\{d_1, d_2, d_3, \ldots, d_i\}$, and $d_1, d_2, d_3, \ldots,$ and $d_i$ satisfy the following formula: $d_1 < d_2 < d_3 < \ldots < d_i$. The attack depth of the asset to be assessed is denoted as $d_{max}$ and satisfies the following formula: $d_{max} = d_i$.

In some embodiments, the obtaining the security feature value of the asset to be assessed can further include: obtaining an attack chain coverage, the number of attacks, an attack breadth, an asset vulnerability profile, an asset protection level, and an asset failure profile of the asset to be assessed which is subjected to attack, and obtaining the security feature value based on the attack chain coverage, the number of attacks, the attack breadth, the asset vulnerability profile, the asset protection level, and the asset failure profile. It can be understood that the attack chain coverage, the number of attacks, the attack breadth, the asset vulnerability profile, the asset protection level, and the asset failure profile of the asset to be assessed can be security features of the asset to be assessed. In addition, a feature value of each security feature can be obtained based on a specific condition of the above security features. Specifically, the attack on the asset to be assessed can be classified based on content of the alert message, and a failed asset can be determined based on the alert message and labeled as failure. Furthermore, a size of damage and a false alarm rate caused by the attack can also be determined according to the alert message, and the alert message can be rated with a high threat level, a medium threat level, or a low threat level based on the size of damage and the false alarm rate caused by the attack, correspondingly.

In some embodiments, the obtaining the security feature value based on the attack chain coverage, the number of attacks, the attack breadth, the asset vulnerability profile, the asset protection level, and the asset failure profile can specifically include:

converting each security feature to a value denoted as $\lambda_i$ by a certain algorithm, and finally obtaining the security feature value denoted as $F=[\lambda_1, \lambda_2, \lambda_3, \ldots, \lambda_n]$.

The value $\lambda_i$ may be in a range of $\{0,1\}$. The security features of the asset to be assessed can include the following feature values.

A first feature value can include a front attack chain coverage.

It can be understood that the front attack chain refers to an attack chain other than an attack with the highest attack depth in the attacks corresponding to the alert message. The alert message involved in the asset to be assessed can be grouped and counted according to the attack depth. The alert message can be regarded as being covered when the attack depth thereof is not 0, and a set of attack steps denoted as $d=\{d_1, d_2, d_3, \ldots, d_{max}\}$ can be obtained. The dmax can be removed from the set of attack steps to obtain the front attack chain set denoted as $D_{pre}$, and elements less than the dmax in the attack depth rating KL can be defined as a subset of the KL denoted as $KL_{pre}$. It can be understood that a feature value of the front attack chain coverage denoted as $\lambda_{pre}$ satisfies the following formula: $\lambda_{pre}$=count $(D_{pre})$/count $(KL_{pre})$. In some embodiments, when the alert message related to the asset to be assessed triggers three nodes in the attack chains: reconnaissance, exploitation, and internal reconnaissance, and the set of attack steps d indicates whether an attack chain is triggered, i.e., the set of attack steps d=$\{1, 0, 1, 0, 1, 0, 0\}$. When the dmax is removed, the count $(D_{pre})$=2, the count $(KL_{pre})$=10, and the $\lambda_{pre}$=2/10.

A second feature value can include the number of attacks.

A reference value may be denoted as t and satisfy the following formula:

$$t = 2\left[lg\left(\frac{\text{the number of attacks}}{\text{days}}\right)\right]/16,$$

and when the number of attacks is not 0, the feature value of the number of attacks may be denoted as $\lambda_{frequency}$=min (t, 1), otherwise $\lambda_{frequency}$=0.

A third feature value can include the attack breadth.

The number of types of alert messages involved in the asset to be assessed can be counted. A reference value may be denoted as m and satisfy the following formula:

$$m = 2\left[\log_2\left(\frac{\text{the number of types of attacks}}{\text{days}}\right)\right]/16,$$

and when the number of types of attacks is not 0, the feature value of the attacked breadth may be denoted as $\lambda_{type}$ and satisfy the following formula:

$\lambda_{type}$=min (m, 1), otherwise $\lambda_{type}$=0.

A fourth feature value can include the asset vulnerability profile.

The asset can be subjected to a penetration test or a vulnerability scanning, to get an asset weakness report. According to a threat level, the number and a corresponding weight of the scanned vulnerability, the feature value of the asset vulnerability profile may be denoted as $\lambda_{vul}$ and satisfy the following formula:

$\lambda_{vul}$=min ((count (vulhigh)*5+count (vulmedium)*2+ count (vullow)*2)/100, 1).

The vul represents vulnerability, the vulhigh represents high-risk vulnerability, the vulmedium represents medium-risk vulnerability, and the vullow represents low-risk vulnerability.

A fifth feature value can include the asset protection level.

The asset protection level can be determined by aspects of protection facilities, user permissions and the like, and can be assigned according to the actual situation. In some embodiments, the feature values of the asset protection level may be denoted as $\lambda_{security}$ and satisfy the following formula:

$$\lambda_{security} = \begin{cases} 0.8, & \text{high asset protection level} \\ 0.5, & \text{medium asset protection level} \\ 0.3, & \text{low asset protection level} \end{cases}$$

A sixth feature value can include the asset failure profile.

The number of failure alarms involved in the asset to be assessed can be counted, when a failure exits, the feature value of the asset failure profile denoted as $\lambda_{fall}$ may be 1, otherwise $\lambda_{fall}$ may be 0.

In some embodiments, the obtaining the feature weight of the security feature value based on the attack depth can further include that the deeper the attack depth is, the greater the feature weights of the feature values of the attack chain coverage and the asset failure profile are, and the less the feature weights of the feature values of the number of attacks, the attack breadth, the asset vulnerability profile, and the asset protection level are. In some embodiments, the deeper the attack depth is, the greater the weight of specific attack behaviors is. The shallower the attack depth is, the greater the weights of behavioral characteristics such as the number of alarms, the attack breadth, asset risk are, and the greater the weight of asset security level categories is.

It can be understood that the security features can be divided into two types including positive features and negative features correlated with the attack depth. For the attack depth rating Deepth, the greater the n is, the greater the weight of the attack depth and corresponding positive features are. The feature weight of the security feature value can be determined by the type and proportion of the security feature, and denoted as $W=[w_1, w_2, w_3, \ldots, w_i]$. In some embodiments, the attack depth may be denoted as $d_{max}$, and the feature weight of the security feature value may be denoted as $W=[\lambda_{pre}, \lambda_{frequency}, \lambda_{type}, \lambda_{vul}, \lambda_{security}, \lambda_{fall}]$, then W may satisfy the $$W = \begin{cases} W_1, & d_{max} \leq 4 \\ W_2, & 4 < d_{max} < 7, \\ W_3, & d_{max} \geq 7 \end{cases}$$

following formulas: $W_1$=[0.1, 0.2, 0.2, 0.2, 0.2, 0.1], $W_2$=[0.3, 0.2, 0, 0, 0.1, 0.1, 0.1], and $W_3$=[0.5, 0, 0.1, 0.1, 0.1, 0.2].

It can be understood that selection of the security feature, assignment of the attack depth, and weight allocation of the feature value may all be determined according to the actual application situation.

In some embodiments, the performing the risk assessment of the asset to be assessed based on the security feature value and the feature weight thereof, to obtain the risk assessment result can further include: multiplying the security feature value with the feature weight in matrix to obtain a risk assessment coefficient, and obtaining the risk assessment result based on the risk assessment coefficient. In some embodiments, the risk assessment coefficient can be calculated based on a set of security feature values denoted as F and a set of feature weight denoted as W, and the risk assessment coefficient may be denoted as result and satisfy the following formula:

result=sum(F*W$^T$)/sum(W).

FIG. 4 is a corresponding relationship diagram of a risk assessment coefficient and a risk assessment result in an asset risk assessment method in an embodiment of the present disclosure. Specifically, the risk assessment result can include five levels of loss, high risk, medium risk, low risk, and health. When the risk assessment coefficient result is greater than or equal to 0.95, the corresponding risk assessment result of the asset may be a loss level. When the risk assessment coefficient result is greater than or equal to 0.7 and less than 0.95, the corresponding risk assessment result of the asset may be a high risk level. When the risk assessment coefficient result is greater than or equal to 0.3 and less than 0.7, the corresponding risk assessment result of the asset may be a medium risk level. When the risk assessment coefficient result is greater than or equal to 0.1 and less than 0.3, the corresponding risk assessment result of the asset may be a low risk level. When the risk assessment coefficient result is less than 0.1, the corresponding risk assessment result of the asset may be a health level. It can be understood that the corresponding relationship of the risk assessment coefficient and the risk assessment result can be determined according to the actual application situation.

In some embodiments, after performing the risk assessment of the asset to be assessed based on the security feature value and the feature weight thereof, to obtain the risk assessment result, the method can further include: obtaining a value parameter of the asset to be assessed based on a category of the asset to be assessed, and obtaining a comprehensive asset assessment result based on the value parameter of the asset to be assessed and the risk assessment result. In some embodiments, an asset value denoted as V of the asset can be rated according to the category, confidentiality, availability, and completeness of the asset to be assessed, referring to $$V = \begin{cases} 0.8, & \text{high valve} \\ 0.5, & \text{medium valve} \\ 0.3, & \text{low valve} \end{cases}$$

The comprehensive asset assessment result can be denoted as [V, result], which is configured to comprehensively assess the asset to be assessed.

Figure 5:
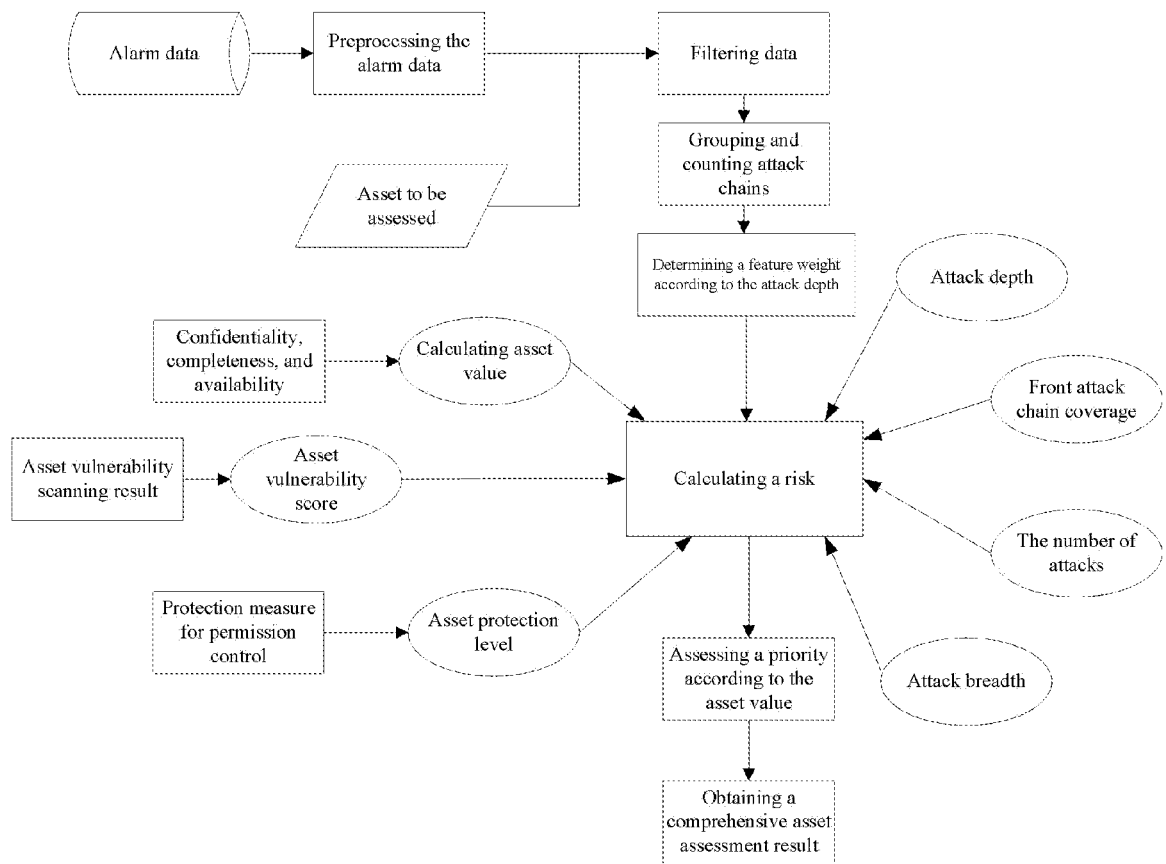
FIG. 5 is a flowchart of an asset risk assessment method in another embodiment of the present disclosure.

FIG. 5 is a flowchart of an asset risk assessment method in another embodiment of the present disclosure. In some embodiments, the method can include receiving an alarm data, preprocessing the alarm data, and filtering data based on the preprocessed alarm data and a profile of an asset to be assessed, to obtain an attack depth and security features. The security features of the asset to be assessed can include a front attack chain coverage, the number of attacks, an attack breadth, an asset vulnerability profile, an asset protection level, and an asset failure profile. Specifically, the method can include obtaining an asset vulnerability score via an asset vulnerability scanning result, and obtaining an asset protection level via a protection measure for permission control. In addition, the method can include obtaining an asset value according to the confidentiality, completeness, and availability of the asset to be assessed.

Moreover, the method can further include grouping and counting attack chains, determining a feature weight of a security feature value of the security feature according to the attack depth, calculating a risk based on the feature weight and the security feature value of the security feature, assessing a priority according to the asset value, and obtaining a comprehensive asset assessment result based on the results of risk calculations and the asset value.

The asset risk assessment method mentioned above includes receiving an alert message of an asset to be assessed, obtaining an attack depth of the alert message based on the alert message, wherein the attack depth is a degree to which the asset to be assessed is subjected to attack, obtaining a security feature value of the asset to be assessed, obtaining a feature weight of the security feature value based on the attack depth, and performing a risk assessment of the asset to be assessed based on the security feature value and the feature weight thereof, to obtain a risk assessment result. With the steps described above, the attack depth of the alert message can be taken as a standard to determine each feature weight of the security feature values of the asset and automatically assess the asset risk, without relying on manual experience, improving efficiency and accuracy of the assessment.

It is noted that the steps illustrated in the process described above or in the accompanying flowchart may be executed in a computer system capable of executing instructions, such as a group of computers. Moreover, although logic sequences are shown in the flowcharts, the shown or described steps may be executed in sequences different from those shown herein in some circumstances.

The present embodiment further provides an asset risk assessment apparatus. The apparatus is configured to implement the above embodiments and alternative embodiments, and details of the above description will not be repeated. As used below, the terms "module", "unit", "subunit" and the like may be a combination of software and/or hardware for implementing a predetermined function. Although the apparatus described in the following embodiments is preferably implemented in software, implementations in hardware, or a combination of software and hardware are also possible and contemplated.

Figure 6:
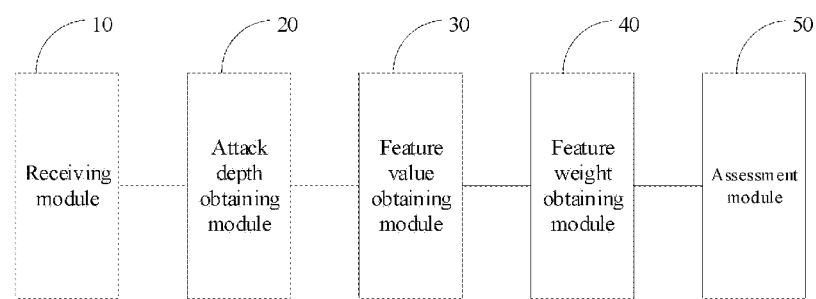
FIG. 6 is a block diagram of an asset risk assessment apparatus in an embodiment of the present disclosure.

FIG. 6 is a block diagram of an asset risk assessment apparatus in an embodiment of the present disclosure. Referring to FIG. 6, the asset risk assessment apparatus includes a receiving module 10, an attack depth obtaining module 20, a feature value obtaining module 30, a feature weight obtaining module 40, and an assessment module 50.

The receiving module 10 is configured for receiving an alert message of an asset to be assessed.

The attack depth obtaining module 20 is configured for obtaining an attack depth of the alert message based on the alert message. The attack depth is a degree to which the asset to be assessed is subjected to attack.

The attack depth obtaining module 20 is further configured for dividing the alert information into attack chains based on a content of the alert information and an attack method; and obtaining the attack depth of the alert message based on the attack chains.

The feature value obtaining module 30 is configured for obtaining a security feature value of the asset to be assessed.

The feature value obtaining module 30 is further configured for obtaining an attack chain coverage, the number of attacks, an attack breadth, an asset vulnerability profile, an asset protection level, and an asset failure profile of the asset to be assessed which is subjected to attack, and obtaining the security feature value based on the attack chain coverage, the number of attacks, the attack breadth, the asset vulnerability profile, the asset protection level, and the asset failure profile.

The feature weight obtaining module 40 is configured for obtaining a feature weight of the security feature value based on the attack depth.

In the feature weight obtaining module 40, the deeper the attack depth is, the greater the feature weights of the feature values of the attack chain coverage and the asset failure profile are, and the less the feature weights of the feature values of the number of attacks, the attack breadth, the asset vulnerability profile, and the asset protection level are.

The assessment module 50 is configured for performing a risk assessment of the asset to be assessed based on the security feature value and the feature weight thereof, to obtain a risk assessment result.

The assessment module 50 is further configured for multiplying the security feature value with the feature weight in matrix to obtain a risk assessment coefficient, and obtaining the risk assessment result based on the risk assessment coefficient.

The asset risk assessment apparatus can further include a comprehensive assessment module.

The comprehensive assessment module is configured for obtaining a value parameter of the asset to be assessed based on a category of the asset to be assessed, and obtaining a comprehensive asset assessment result based on the value parameter of the asset to be assessed and the risk assessment result.

It should be noted that the various modules mentioned above may be function modules or program modules, and may be implemented either by software or hardware. For modules implemented by hardware, the modules mentioned above may be located in the same processor; or the modules mentioned above may be separately located in different processors in any combination form.

In addition, the asset risk assessment method of embodiments of the present disclosure described in conjunction with FIG. 1 may be implemented by a computer device.

The computer device may include a processor 71 and a memory 72 that stores computer program instructions.

Specifically, the processor 71 described above may include a Central Processing Unit (CPU), or an Application Specific Integrated Circuit (ASIC), or may be configured to implement one or more integrated circuits of embodiments of the present disclosure.

The memory 72 may include mass storage for data or instructions. By way of example and not limitation, the memory 72 may include a Hard Disk Drive (HDD), a floppy disk drive, a Solid State Drive (SSD), a flash memory, an optical disk, a magnetic disk, a magnetic tape, or a Universal Serial Bus (USB) drive or a combination of two or more of the above. Where appropriate, the memory 72 may include removable or non-removable (or fixed) media. Where appropriate, memory 72 may be internal or external to the data processing device. In particular embodiments, memory 72 is Non-Volatile memory. In particular embodiments, the memory 72 includes Read-Only Memory (ROM) and Random Access Memory (RAM). Where appropriate, the ROM may be a mask-programmable ROM, a Programmable Read-Only Memory (PROM), an Erasable Programmable Read-Only Memory (EPROM), an Electrically Erasable PROM (Electrically Erasable Programmable Read-Only Memory), an Electrically Alterable Read-Only Memory (EAROM), or a Flash Memory, or a combination of two or more of the above. Where appropriate, the RAM may be a Static Random-Access Memory (SRAM) or a Dynamic Random Access Memory (DRAM), where the DRAM may be Fast Page Mode Dynamic Random Access Memory (FPMDRAM). The DRAM can be Fast Page Mode Dynamic Random Access Memory (FPMDRAM), Extended Data Out Dynamic Random Access Memory (EDODRAM), or Synchronous Dynamic Random-Access Memory (SDRAM), etc.

The memory 72 may be configured to store or cache various data files to be processed and/or communicated, and processor 71 may execute computer program instructions.

The processor 71 is configured for achieving any of the above embodiments of the asset risk assessment method by reading and executing the computer program instructions stored in the memory 72.

Figure 7:
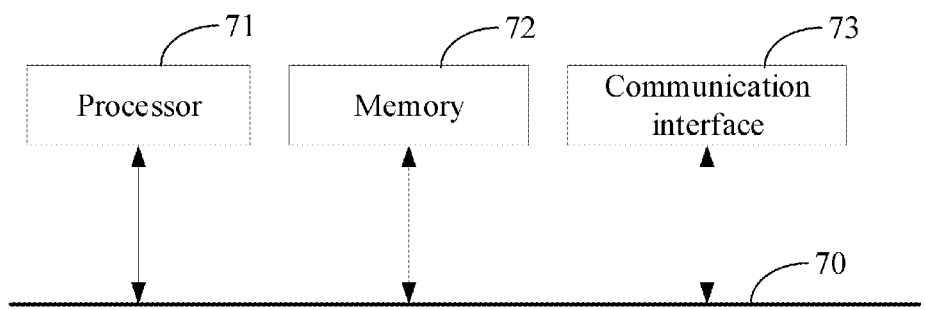
FIG. 7 is a block diagram of a hardware structure of a computer device.

In some embodiments, the computer device may also include a communication interface 73 and a bus 70. Referring to FIG. 7, the processor 71, the memory 72, the communication interface 73 can be connected and communicated with each other via the bus 70.

The communication interface 73 is configured to implement communication between modules, apparatus, units and/or devices in embodiments of the present disclosure. The communication interface 73 may also realize data communication with other components such as: external devices, image/data acquisition devices, databases, external storage, and image/data processing workstations.

The bus 70 includes hardware, software or both, the components of the computer device are coupled with each other. The bus 70 includes, but is not limited to, at least one of the following: Data Bus, Address Bus, Control Bus, Expansion Bus, Local Bus. By way of example and not limitation, the bus 70 may include Accelerated Graphics Port (AGP) or other graphics buses, Extended Industry Standard Architecture (EISA) buses, Front Side Bus (FSB), Hyper Transport (HT) interconnect, Industry Standard Architecture (ISA) bus, InfiniBand interconnect, Low Pin Count (LPC) bus, memory bus, Micro Channel Architecture (MCA) bus, Peripheral Component Interconnect (PCI) bus, PCI-Express (PCI-X) bus, Serial Advanced Technology Attachment (SATA) bus, Video Electronics Standards Association Local Bus (VLB) bus or other suitable bus or a combination of two or more of the above. Where appropriate, the bus 70 may include one or more buses. Although embodiments of the present disclosure describe and illustrate a particular bus, any suitable bus or interconnection can be considered in the present disclosure.

The computer device may execute the asset risk assessment method in the embodiment of the present disclosure based on the obtained computer program instructions, thereby achieving the asset risk assessment method in conjunction with the description of FIG. 1.

Furthermore, in conjunction with the asset risk assessment method in the above embodiment, an embodiment of the present disclosure may provide a computer-readable storage medium to achieve. The computer-readable storage medium stores computer program instructions, and the computer program is executed by a processor to implement any of the asset risk assessment methods in the above embodiments.

The present disclosure provides an asset risk assessment method, an apparatus, a computer device, and a storage medium. The method includes receiving an alert message of an asset to be assessed, obtaining an attack depth of the alert message based on the alert message, wherein the attack depth is a degree to which the asset to be assessed is subjected to attack, obtaining a security feature value of the asset to be assessed, obtaining a feature weight of the security feature value based on the attack depth, and performing a risk assessment of the asset to be assessed based on the security feature value and the feature weight thereof, to obtain a risk assessment result. With the steps described above, the attack depth of the alert message can be taken as a standard to determine each of the feature weight of the security feature value of the asset and automatically assess the asset risk, without relying on manual experience, improving efficiency and accuracy of the assessment.

The technical features of the above-described embodiments may be combined in any combination. For the sake of brevity of description, not all possible combinations of the technical features in the above embodiments are described. However, as long as there is no contradiction between the combinations of these technical features, all should be considered as within the scope of this disclosure.

The above-described embodiments are merely illustrative of several embodiments of the present disclosure, and the description thereof is relatively specific and detailed, but is not to be construed as limiting the scope of the disclosure. It should be noted that a number of variations and modifications may be made by those skilled in the art without departing from the spirit and scope of the disclosure. Therefore, the scope of the disclosure should be determined by the appended claims.

What is claimed is:

1. An asset risk assessment method, implemented by a computer device, wherein the computer device may include a processor and a memory that stores computer program instructions, and the method comprises:
   receiving an alert message of an asset to be assessed;
   obtaining an attack depth of the alert message based on the alert message, wherein the attack depth is a degree to which the asset to be assessed is subjected to attack;
   obtaining a security feature value of the asset to be assessed;
   obtaining a feature weight of the security feature value based on the attack depth; and
   performing a risk assessment of the asset to be assessed based on the security feature value and the feature weight thereof, to obtain a risk assessment result;
   obtaining the attack depth of the alert message based on the alert message further comprises:
   dividing the alert information into attack chains based on a content of the alert information and an attack method; and
   obtaining the attack depth of the alert message based on the attack chains, wherein each alert message is hidden danger data obtained after detection of the corresponding asset.

2. The asset risk assessment method of claim 1, wherein the obtaining the security feature value of the asset to be assessed further comprises:
   obtaining an attack chain coverage, the number of attacks, an attack breadth, an asset vulnerability profile, an asset protection level, and an asset failure profile of the asset to be assessed which is subjected to attack; and
   obtaining the security feature value based on the attack chain coverage, the number of attacks, the attack breadth, the asset vulnerability profile, the asset protection level, and the asset failure profile.

3. The asset risk assessment method of claim 2, wherein the obtaining the feature weight of the security feature value based on the attack depth further comprises:
   the deeper the attack depth is, the greater the feature weights of the feature values of the attack chain coverage and the asset failure profile are, and the less the feature weights of the feature values of the number of attacks, the attack breadth, the asset vulnerability profile, and the asset protection level are.

4. The asset risk assessment method of claim 1, wherein the performing the risk assessment of the asset to be assessed based on the security feature value and the feature weight thereof, to obtain the risk assessment result further comprises:
   multiplying the security feature value with the feature weight in matrix to obtain a risk assessment coefficient; and
   obtaining the risk assessment result based on the risk assessment coefficient.

5. The asset risk assessment method of claim 4, wherein the risk assessment result comprises five levels of failure, high risk, medium risk, low risk, and healthy.

6. The asset risk assessment method of claim 1, wherein after performing the risk assessment of the asset to be assessed based on the security feature value and the feature weight thereof, to obtain the risk assessment result, the method further comprises:
   obtaining a value parameter of the asset to be assessed based on a category of the asset to be assessed; and
   obtaining a comprehensive asset assessment result based on the value parameter of the asset to be assessed and the risk assessment result.

7. A computer device, comprising a processor and a memory that stores a computer program running on the processor, wherein the computer program is executed by the processor to implement the steps of the asset risk assessment method of claim 1.

8. The computer device of claim 7, wherein the obtaining the security feature value of the asset to be assessed further comprises:
   obtaining an attack chain coverage, the number of attacks, an attack breadth, an asset vulnerability profile, an asset protection level, and an asset failure profile of the asset to be assessed which is subjected to attack; and
   obtaining the security feature value based on the attack chain coverage, the number of attacks, the attack breadth, the asset vulnerability profile, the asset protection level, and the asset failure profile.

9. The computer device of claim 8, wherein the obtaining the feature weight of the security feature value based on the attack depth further comprises:
   the deeper the attack depth is, the greater the feature weights of the feature values of the attack chain coverage and the asset failure profile are, and the less the feature weights of the feature values of the number of attacks, the attack breadth, the asset vulnerability profile, and the asset protection level are.

10. The computer device of claim 7, wherein the performing the risk assessment of the asset to be assessed based on the security feature value and the feature weight thereof, to obtain the risk assessment result further comprises:
    multiplying the security feature value with the feature weight in matrix to obtain a risk assessment coefficient; and
    obtaining the risk assessment result based on the risk assessment coefficient.

11. The computer device of claim 10, wherein the risk assessment result comprises five levels of failure, high risk, medium risk, low risk, and healthy.

12. The computer device of claim 7, wherein after performing the risk assessment of the asset to be assessed based on the security feature value and the feature weight thereof, to obtain the risk assessment result, the method further comprises:
  obtaining a value parameter of the asset to be assessed based on a category of the asset to be assessed; and
  obtaining a comprehensive asset assessment result based on the value parameter of the asset to be assessed and the risk assessment result.

13. A storage medium having stored a computer program, wherein the computer program is executed by a processor to implement the steps of the asset risk assessment method of claim 1.

14. The storage medium of claim 13, wherein the obtaining the security feature value of the asset to be assessed further comprises:
  obtaining an attack chain coverage, the number of attacks, an attack breadth, an asset vulnerability profile, an asset protection level, and an asset failure profile of the asset to be assessed which is subjected to attack; and
  obtaining the security feature value based on the attack chain coverage, the number of attacks, the attack breadth, the asset vulnerability profile, the asset protection level, and the asset failure profile.

15. The storage medium of claim 14, wherein the obtaining the feature weight of the security feature value based on the attack depth further comprises:
  the deeper the attack depth is, the greater the feature weights of the feature values of the attack chain coverage and the asset failure profile are, and the less the feature weights of the feature values of the number of attacks, the attack breadth, the asset vulnerability profile, and the asset protection level are.

16. The storage medium of claim 15, wherein the performing the risk assessment of the asset to be assessed based on the security feature value and the feature weight thereof, to obtain the risk assessment result further comprises:
  multiplying the security feature value with the feature weight in matrix to obtain a risk assessment coefficient; and
  obtaining the risk assessment result based on the risk assessment coefficient.

* * * * *